United States Patent [19]

Ambrose et al.

[11] Patent Number: 4,859,743
[45] Date of Patent: Aug. 22, 1989

[54] URETHANE COMPONENT FOR HIGH SOLIDS COATING COMPOSITIONS

[75] Inventors: Ronald R. Ambrose, Allison Park; James B. O'Dwyer, Valencia; Byron K. Johnston, Arnold; David P. Zielinski, Gibsonia; Samuel Porter, Jr., Natrona Heights; Wayne H. Tyger, New Kensington, all of Pa.

[73] Assignee: PPG Industries, Inc., Pittsburgh, Pa.

[21] Appl. No.: 209,716

[22] Filed: Jun. 22, 1988

[51] Int. Cl.$^4$ .............................................. C08L 75/04
[52] U.S. Cl. ................................... 525/443; 525/456; 528/76; 528/77; 528/81; 528/83; 528/230; 427/385.5; 427/388.1; 427/407.1; 427/409
[58] Field of Search .................. 525/443, 456; 528/76, 528/77, 81, 83, 230; 427/385.5, 388.1, 407.1, 409

[56] References Cited

U.S. PATENT DOCUMENTS

| | | | |
|---|---|---|---|
| 3,523,100 | 8/1970 | Stein et al. | 260/47 |
| 3,748,294 | 7/1973 | Kershaw et al. | 260/22 TN |
| 3,912,691 | 10/1975 | Emmons | 260/77.5 MA |
| 4,024,117 | 5/1977 | Emmons | 260/78.3 R |
| 4,032,686 | 6/1977 | Emmons | 428/425 |
| 4,205,115 | 5/1980 | Piccirilli et al. | 428/334 |
| 4,311,622 | 1/1982 | Buter | 260/18 EP |
| 4,337,184 | 6/1982 | Schimmel et al. | 524/726 |
| 4,404,248 | 9/1983 | Spinelli et al. | 428/215 |
| 4,423,179 | 12/1983 | Guagliardo | 524/539 |
| 4,522,986 | 6/1985 | Short et al. | 525/458 |
| 4,528,319 | 7/1985 | Ottaviani et al. | 524/540 |

FOREIGN PATENT DOCUMENTS 1069735 5/1967 United Kingdom .

OTHER PUBLICATIONS

Henkel Corporation, Polymers Division, product brochure entitled "DDI® 1410 Diisocyanate" published by Henkel Corporation, Polymers Division.
Kamal and Wicklatz, "A New Aliphatic Diisocyanate", Journal Series No. 384, Central Research Laboratories, General Mills, Inc., Minneapolis, MN, published by the American Chemical Society, Mar. 1966, vol. 26, No. 1, copyright by the American Chemical Society, Division of Organic Coating and Plastics Chemistry.
Coutinho, Rezende and Quijada, "Kinetic Study of the Reaction Between Hydroxylated Polybutadienes and Isocyanates. II. Reaction with 3-Isocyanatomethyl-3,5,5-Trimethylcyclohexylisocyanate and Dimer Diacid Diisocyanate", Journal of Polymer Science: Part A: Polymer Chemistry, vol. 3021-3032, published 1986 by John Wiley & Sons, Inc.
Stephens, Sarascan, Vaidya and Winkler, "Room Temperature Cured Glycol/Dimer Diisocyanate Urethane Elastomers", Journal of Elastomers and Plastics, vol. 7, Jan. 1975, pp. 35 and 46.

Primary Examiner—Maurice J. Welsh
Attorney, Agent, or Firm—Linda Pingitore

[57] ABSTRACT

A high solids coating composition having a total solids content of at least 40 percent contains as a film former a urethane vehicle having a hydroxyl value of at least about 50 and a number average molecular weight of no more than 4,000 which is prepared from reactants containing a hydroxyl functional polyether or polyester or mixtures thereof of a molecular weight less than 1,000 and average functionality not exceeding 3 and at least 10 weight percent based on the total weight of hydroxyl functional polyether or polyester or mixtures thereof and polyisocyanate of a polyisocyanate having isocyanate groups separated by one or more hydrophobic moieties, each moiety containing at least 12 consecutive carbon atoms in a continuous chain; and an aminoplast crosslinking agent.

25 Claims, No Drawings

URETHANE COMPONENT FOR HIGH SOLIDS COATING COMPOSITIONS

BACKGROUND OF THE INVENTION

This invention relates to high solids coating compositions. In the area of automotive coatings, a coating is typically desired which provides not only a lustrous or glamourous appearance but also good corrosion protection. In order to achieve the desired effect, the automobile is typically provided with several coating layers. Therefore, usually a pigmented coating composition is first applied followed by a transparent topcoat. By transparent is meant a clear coating, that is one which does not contain pigmentation or contains only transparent pigments. Such a coating system is commonly referred to as a "clear-over-color" or "color plus clear".

A very important feature required of color plus clear systems is good "strike-in" ("soak-in") resistance of the basecoat. By "strike-in" resistance is meant the ability of the basecoat compposition of a multicoat system to resist attack by the solvents in the topcoat composition. The topcoat "striking-in" to the basecoat is particularly undesirable since it adversely affects alignment of the metallic pigment generally found in the basecoat and reduces or eliminates the "flop" and the gloss of the topcoat. By "flop" is meant the visual change in brightness or lightness of the metallic aluminum flake with a change in the viewing angle. That is, a change of from 90 to 180 degrees. The greater the visual change from light to dark appearance, the better the flop. The flop accentuates the lines and curves of an automobile; therefore, it is very important in achieving the desired appearance of the coating.

The "strike-in" is a problem because the automobile manufacturers generally wish to apply the topcoat composition to the basecoat composition in a color-plus-clear system by a "wet-on-wet" technique. By this is meant that the basecoat composition is applied to the substrate followed by the topcoat composition and then a single baking step is utilized to cure the composite coating. This problem of topcoat "striking in" to the basecoat is especially pronounced with high solids clear topcoating compositions which are formulated from low molecular weight polymers.

Many different approaches have been utilized to remedy the problem of the topcoat "striking-in" to the basecoat with various degrees of success. One approach has been the use of different rheology additives. Some of these have been disadvantageous in several respects including diminished sprayability at the desired high solids level as well as detrimental effects to the flop because of darkening of the topcoating composition.

There is a need therefore for a way to improve the "strike-in" resistance of basecoating compositions, particularly when applied wet-on-wet with high solids clear topcoating compositions, without detrimental effects to flop and sprayability at the desired high solids levels.

SUMMARY OF THE INVENTION

In accordance with the present invention, there is provided a high solids coating composition having a total solids content of at least 40 percent, comprising as a film former a urethane polymer having a hydroxyl value of at least about 50 and a number average molecular weight of no more than 4,000 which is prepared from reactants comprising a hydroxyl functional polyether or polyester or mixtures thereof of a number average molecular weight less than 1,000 and average functionality not exceeding 3 and at least 10 weight percent based on the total weight of hydroxyl functional polyether or polyester or mixtures thereof and polyisocyanate of a polyisocyanate having isocyanate groups separated by one or more hydrophobic moieties, each moiety containing at least 16 consecutive carbon atoms in a continuous chain; and an aminoplast crosslinking agent.

Further provided in accordance with the present invention is a high solids coating composition having a total solids content of at least 40 percent, comprising a polyester polyol as the film forming polymer, said polyester containing one or more hydrophobic moieties, each moiety containing at least 12 consecutive carbon atoms in a continuous chain and the total amount of hydrophobic moieties constituting at least 40 percent by weight of the polyester film-forming polymer; a substantially hydrophobic, urethane additive having a hydroxyl value of at least 100 which is prepared from reactants comprising a polyol having a number average molecular weight of less than 1,000 and a polyisocyanate having isocyanate groups separated by one or more hydrophobic moieties, each moiety containing at least 12 consecutive carbon atoms in a continuous chain.

Also provided in accordance with the present invention are various methods of forming multicoated articles. In one method the basecoating composition is a pigmented high solids coating composition as has been detailed above and the topcoat is any conventional clearcoating composition. In an alternative method, the basecoating composition is any conventional pigmented basecoating composition while the topcoat is a clear high solids coating composition as has been detailed above.

In accordance with the above description, a multicoated article can be prepared by first applying to the surface of the substrate the desired basecoating composition followed by the clear topcoating composition and then at least partially curing the multicoated article to form a composite coating on the substrate.

DETAILED DESCRIPTION OF THE INVENTION

The high solids coating composition of one embodiment of the present invention has a total solids content of at least 40 percent, preferably at least 50 percent and more preferably at least 55 percent. In this embodiment the claimed coating composition comprises a urethane polymeric polyol as a film former and an aminoplast resin as a crosslinking agent. The urethane polyol has a hydroxyl value of at least about 50, preferably at least about 75 and more preferably at least about 100. The number average molecular weight of the urethane polyol should not exceed 4,000 preferably no more than 3,000 and more preferably no more than about 2,500. Usually the number average molecular weight ranges from about 500 to about 4,000, preferably from about 500 to about 3,000. Most preferably the number average molecular weight of the urethane vehicle ranges from about 500 to about 1,500. The urethane polymer is prepared from reactants comprising a hydroxyl functional polyether or polyester or mixtures thereof of a number average molecular weight less than 1,000 and average functionality not exceeding 3 and a particular type of polyisocyanate which is described more fully in the following paragraphs. Preferably either polyester polyols or mixtures of polyester polyols and polyether polyols are utilized. Suitable polyether and polyester polyols are described below.

Examples of polyether polyols are polyalkylene ether polyols which include those having the following structural formula:

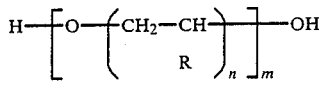

where the substituent R is hydrogen or lower alkyl containing from 1 to 5 carbon atoms including mixed substituents, and n is typically from 1 to 6 and m is from 2 to 25 or even higher. Included are poly(oxytetramethylene)glycols, poly(oxyethylene)glycols, poly(oxy-1,2-propylene)glycols and the reaction products of ethylene glycol with a mixture of 1,2-propylene oxide, ethylene oxide and allyl glycidyl ethers.

Also useful are polyether polyols formed from oxyalkylation of various polyols, for example, glycols such as ethylene glycol, 1,6-hexanediol, Bisphenol A and the like, or triols such as trimethylolpropane. One commonly utilized oxyalkylation method is by reacting a polyol with an alkylene oxide, for example, ethylene or propylene oxide, in the presence of an acidic or basic catalyst.

In addition to the polyols mentioned above, mixtures of these polyols with diols or triols can be used. Among the suitable diols, which are preferred, and triols are materials such as aliphatic polyols including alkylene polyols containing from 2 to 18 carbon atoms. Examples include ethylene glycol, 1,4-butanediol, 1,6-hexanediol; cycloaliphatic polyols such as 1,2-hexanediol and cyclohexanedimethanol. Examples of triols include trimethylolpropane and trimethylolethane. Also useful are polyols containing ether linkages such as diethylene glycol and triethylene glycol.

Polyester polyols can be prepared by the polyesterification of an organic polycarboxylic acid or its functional equivalent. (e.g., anhydride or ester) with organic polyols and/or an epoxide. Usually, the polycarboxylic acids and polyols are aliphatic or aromatic dibasic acids and diols.

The diols which are usually employed in making the polyester include alkylene glycols, such as ethylene glycol, neopentyl glycol and other glycols such as hydrogenated Bisphenol A, cyclohexanediol, cyclohexanedimethanol, caprolactone derived diols, for example, the reaction product of epsilon-caprolactone and ethylene glycol, hydroxyalkylated bisphenols, polyether glycols, for example, poly(oxytetramethylene glycol and the like. Triols can also be used. Examples include trimethylolpropane and trimethylolethane as well as higher molecular weight triols such as those produced by oxyalkylating lower molecular weight triols.

The acid component of the polyester consists primarily of monomeric carboxylic acids or anhydrides having 2 to 36 carbon atoms per molecule. Among the acids which are useful are phthalic acid, isophthalic acid, terephthalic acid, tetrahydrophthalic acid, decanedioic acid, dodecanedioic acid, and other dicarboxylic acids of varying types. The polyester may include minor amounts of monobasic acid such as benzoic acid, stearic acid, acetic acid, hydroxystearic acid and oleic acid. Also, there may be employed higher polycarboxylic acids such as trimellitic acid and tricarballylic acid.

Where acids are referred to above, it is understood that anhydrides of those acids which form anhydrides can be used in place of the acid. Also, lower alkyl esters of the acids such as dimethyl glutarate and dimethyl terephthalate can be used.

Besides polyester polyols formed from polybasic acids and polyols, polylactone-type polyesters can also be employed. These products are formed from the reaction of a lactone such as epsiloncaprolacetone and a polyol. The product of a lactone with an acid-containing polyol can also be used.

The number average molecular weight is determined utilizing gel permeation chromatography using polystyrene as a standard. In measuring the number average molecular weight using polystyrene as the standard, a Waters Associates gel permeation chromatograph was used. Six micro-styragel columns were used. Each column had the dimensions of 30 centimeters long and 7.8 millimeters inside diameter. A differential refractometer was used as detector. Tetrahydrofuran was used as a solvent with a flow rate of 2.0 millimeters/minute. The quality of the columns was checked by their "theoretical plate number" determined from ortho-dichlorobenzene and had minimum theoretical plate numbers of 3,000/30 cm.

To determine molecular weight by gel permeation chromatography (GPC), the instrument is first calibrated using polystyrene standards. Polystyrene standards used were purchased from Pressure Chemicals Company, Pittsburgh, Pa. The polystyrene standards have dispersities (dispersity=weight average molecular weight/number average molecular weight) ranging from 1.05 to 1.10. The number average molecular weights of the polystyrene standards used were 900,000; 830,000; 233,000; 50,000; 34,500; 17,500 and 4,000. To obtain a calibration curve, a set of 0.10 percent (10 milligram polystrene/10 ml tetrahydrofuran) polystyrene solutions in tetrahydrofuran were prepared and a 0.3 milliliter sample size was injected into the columns and a GPC chromatogram was obtained. The elution volume of each peak corresponding to a given molecular weight of the polystyrene standard was measured. A linear least squares plot of $\log_{10}$ (molecular weight) versus elution time is used as a calibration curve. The lowest molecular weight of the polystyrene standard used was 4,000 and the calibration curve beyond that was extrapolated down to 100. The upper and lower exclusion limits of this set of columns are about 1,000,000 and 100, respectively, in terms of polystyrene molecular weight. The sample whose molecular weight average was to be determined was prepared as a 1.0 percent in solution tetrahydrofuran. After filtration through a 0.2 micron GELMAN filter, available from Acrodisc CR, a 0.3 milliliter sample size was injected into the columns and a GPC chromatogram obtained under the same experimental conditions as the calibration. A computer acquires data corresponding to the height of the curve every two seconds. The retention times for each interval are converted to molecular weight (Mi) using the calibration curve. The number average molecular weight ($M_n$) was calculated according to the following equation:

$$\Sigma Hi \ X\Sigma Mi/\Sigma Hi$$

The polyisocyanate which is utilized in the preparation of the urethane polyol is used in an amount of at least about 10 weight percent, preferably at least 20 weight percent and more preferably from about 10 to about 40 weight percent, the percentages being based upon the total weight of the hydroxyl functional polyether or polyester or mixtures thereof and polyisocyanate.

The claimed polyisocyanates are those having isocyanate groups separated by one or more hydrophobic moieties, each moiety containing at least 12 consecutive carbon atoms in a continuous chain. More preferably each hydrophobic moiety has at least 16 consecutive carbon atoms in a continuous chain. Suitable polyisocyanates include dimer diisocyanate, the reaction product of hydroxyethyl dimerate with a diisocyanate such as toluene diisocyanate, trimethylhexamethylene diisocyanate, 4,4'-dicyclohexyl diisocyanate, isophorone diisocyanate, isocyanurates such as the isocyanurate of isophorone diisocyanate commercially available from Veba Company as T 1890 and biurets such as the biuret which is commercially available from Bayer as DESMODUR N. Preferably dimer diisocyanate is utilized herein. Dimer diisocyanate is an aliphatic diisocyanate which is commercially available from Henkel Corporation as DDI 1410 ® diisocyanate. The material is represented by Henkel in its product literature as being based on a long chain, dimerized fatty acid backbone containing 36 carbon atoms. Thus, dimer diisocyante contains 16 consecutive carbon atoms between isocyanate groups. The high carbon content backbone structure endows dimer diisocyanate with the property of water insensitivity.

The claimed high solids coating composition contains, in addition to the urethane film forming vehicle, an aminoplast crosslinking agent. The crosslinking agent is described more fully below.

Aminoplast resins are based on the addition products of formaldehyde, with an amino- or amino-group carrying substance. Condensation products obtained from the reaction of alcohols and formaldehyde with melamine, urea or benzoguanamide are most common and are preferred herein. However, condensation products of other amines and amides can also be employed, for example, aldehyde condensates of triazines, diazines, triazoles, guanidines, guanamines and alkyl- and aryl-substituted derivatives of such compounds, including alkyl- and aryl-substituted melamines. Some examples of such compounds are N,N'-dimethyl urea, benzourea, dicyandiamide, formoguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diamino-pyrimidine, 3,4,6-tris(ethylamino)-1,3,5-triazine, and the like.

The aldehyde resins typically contain methylol or similar alkylol groups, and in most instances at least a portion of these alkylol groups are etherified by reaction with an alcohol. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols such as cyclohexanol, monoethers of glycols such as those sold under the trademarks CELLOSOLVE and CARBITOL, by Union Carbide and halogen-substituted or other substituted alcohols, such as 3-chloropropanol and butoxyethanol. The preferred aminoplast resins are substantially alkylated with methanol.

In another embodiment of the present invention, there is provided a further high solids coating composition having a total solids content of at least 40 percent, preferably at least 50 percent and more preferably at least 55 percent. This composition comprises a polyester polyol as the film forming polymer which contains one or more hydrophobic moieties, a substantially hydrophobic, urethane additive; and a crosslinking agent adapted to crosslink with the polyester polyol film forming polymer. Each hydrophobic moiety of the film forming polymer contains at least 12 consecutive carbon atoms, more preferably at least 16, in a continuous chain and the total amount of the hydrophobic moieties constitutes at least 40 percent by weight of the polyester polyol film forming polymer. Preferably the hydrophobic moieties constitute at least 50 percent, more preferably at least 60 percent by weight of the film forming polymer. Suitable polyester polyols which have the requisite hydrophobic content can be prepared, for example, by the use of a hydrophobic acid component in the preparation of the polyester such as dimer acid, hydroxyethyl dimerate, dodecanedioc acid or 12-hydroxystearic acid.

Other polyester polyols which have been described in detail above can be utilized in admixture with the hydrophobic polyester.

The substantially hydrophobic urethane additive of the claimed coating composition generally has a number average molecular weight of from about 500 to about 4,000, preferably from 500 to 1,500 and a hydroxyl value of at least about 100. The urethane additive is prepared from reactants comprising a polyol having a number average molecular weight of less than 1,000 and a polyisocyanate having isocyanate groups separated by one or more hydrophobic moieties. Each hydrophobic moiety contains at least 12 consecutive carbon atoms in a continuous chain, more preferably at least 16. Suitable such polyisocyanates have been discussed in detail above. Preferably dimer diisocyanate is utilized. In one embodiment the substantially hydrophobic urethane additive is prepared from a monomeric glycol such as neopentyl glycol and a mixture of polyisocyanates comprising an isocyanate having diisocyanate groups separated by at least 16 consecutive carbon atoms in a continuous chain such as dimer diisocyanate and a diisocyanate having isocyanate groups separated by no more than 9 consecutive carbon atoms in a continuous chain. Examples of the latter diisocyanates include toluene diisocyanate, isophorone diisocyanate, trimetylhexamethylene diisocyanate and 4,4'-dicyclohexyl diisocyanate.

The crosslinking agent for use in the present coating composition is preferably an aminoplast crosslinking agent as has been detailed above in the specification. If desired, polyisocyanate crosslinking agent which can be blocked or unblocked are suitable for use herein. Any of the diisocyanates, isocyanurates or biurets which have been disclosed above are exemplary of suitable polyisocyanates. Examples of suitable blocking agents are those materials which would unblock at elevated temperatures such as lower aliphatic alcohols such as methanol, oximes such as methyl ethyl ketoxime and lactams such as caprolactam. The use of blocked polyisocyanate facilitates the preparation of a one package composition. For a two package composition it is important that the polyisocyanate and active hydrogen be in separate packages since these are mixed prior to application. The other ingredients can be in either package as desired, the specific package chosen depending on the particular material.

Preferably the claimed coating compositions of the present invention additionally comprise a metallic pigment such as aluminum flake.

In addition to the ingredients discussed above, the claimed coating compositions can contain a variety of other optional components. In addition to metallic pigment, a variety of conventional pigments can also be used such as talc, titanium dioxide, iron oxides, lead oxides and many color pigments. Other resinous ingredients can also be added so long as they do not detrimentally affect the properties of the ultimate composition.

A diluent which is organic solvent or non-solvent is also typically utilized to reduce viscosity sufficiently to enable application. Also, these materials assist in substrate wetting and film coalescence. Examples of suitable materials include toluene, xylene, methyl amyl ketone, methyl isobutyl ketone, monoethyl ethers of glycols, alcohols, and mixtures thereof.

Generally a catalyst is utilized to reduce the cure temperature and/or cure schedule. Examples of preferred catalysts for aminoplast crosslinking agents include acids such as paratoluene sulfonic acid. Examples of preferred catalysts for polyisocyanates are organotin compounds such as dibutyltin dilaurate and dibutyltin diacetate. A variety of rheology modifiers such as microgel also can be used. The claimed coating compositions can be applied by conventional methods to a vareity of substrates. The particular method, substrate and cure schedule are dependent upon the desired end use and the specific materials involved.

Each of the claimed coating compositions described in detail herein is particularly suitable in methods for preparing multicoated articles. In one embodiment of the claimed invention, a method of forming a multicoated article is provided which comprises applying to the surface of a substrate either of the aforedescribed claimed high solids coating compositions as a pigmented basecoat followed by applying to said basecoat a clear film forming composition and then at least partially curing the multicoated article to form a composite coating on the substrate. The clear coating composition can be selected from a variety of conventionally utilized commercially available compositions. In a preferred embodiment of this method, the film forming polymer of the clear coating composition contains hydrophobic moieties which constitute less than 20 percent by weight preferably less than 10 percent by weight of the polymer. It is believed that the difference in hydrophobic content between the basecoat and the clearcoat composition contributes to the incompatibility of the two coating compositions which results in improved strike-in resistance of the basecoat to the clearcoat composition.

Further provided by the present invention is an alternative method of forming a multicoated article. The method comprises applying to the surface of the substrate a pigmented basecoating composition which can be selected from a variety of conventionally known and commercially available basecoating compositions, followed by applying to said basecoat either of the high solids coating compositions of the present invention formulated as a clear coating composition. The coated substrate is then at least partially cured to form a composite coating on the substrate. Preferably, in this method, the film forming polymer of the basecoat composition contains hydrophobic moieties which constitute less than 20 percent by weight preferably less than 10 percent by weight of the polymer. As mentioned above, it is believed that the incompatibility between the basecoat and the clearcoat contributes to improved strike-in resistance of the basecoat composition to the clear topcoat composition, in wet-on-wet applications.

The claimed coating compositions of the present invention are particularly advantageous in that they have a high solids content, a low volatile organic content (less than 4.0) and in addition result in good film properties. One particular advantage is the good strike-in resistance of the claimed coating compositions when they are utilized as basecoats in color plus clear applications applied. The same effect is observed when the claimed coating compositions are utilized as clear topcoats with conventional basecoats in color plus clear application.

The following examples are illustrative of the invention and are not intended to be limiting.

EXAMPLE I

This example illustrates the preparation of several urethane polyols according to the present invention and their use as film formers in the preparation of pigmented basecoating compositions for color plus clear application.

| Urethane Polyol A | |
|---|---|
| Ingredients | Percent by Weight |
| polyester polyol[1] | 57.6 |
| dimer diisocyanate[2] | 42.3 |
| dibutyltin dilaurate | 0.01 |

[1] This polyester polyol was prepared from 27.64 percent neopentyl glycol, 40.92 percent hexahydrophthalic anhydride, 31.34 percent 1,6-hexanediol, 0.05 percent triphenyl phosphite. The polyester polyol had a theoretical total solids content of 89.5 percent in methyl isobutyl ketone, a hydroxyl value of 270 to 290 and an acid value of 7 to 9, a Gardner Holdt viscosity of U to W and a number average molecular weight of 272 determined by GPC.
[2] This was commercially available from Henkel Corporation as DDI 1410 ® diisocyanate.

A suitably equipped reactor vessel was charged with the aforelisted ingredients and heated to 60° C. under a nitrogen blanket. After about one hour the temperature was raised to 90° C. and maintained at this temperature for about 20 minutes at which time analysis of a sample of the mixture by infrared spectroscopy indicated the disappearance of isocyanate. The urethane polyol was then reduced to 80 percent total solids with xylene. The urethane polyol had a theoretical hydroxyl value of 70, an acid value of less than 1 and a number average molecular weight of 1350 as determined by GPC.

| Urethane Polyol B | |
|---|---|
| Ingredients | Percent by Weight |
| polyester polyol of footnote (1) | 75 |
| dimer diisocyanate of footnote (2) | 25 |
| dibutyltin dilaurate | 0.01 |

The urethane polyol was prepared as detailed above for urethane polyol A in xylene. The urethane polyol had a theoretical hydroxyl value of 153 a Gardner Holdt viscosity of Z4+ and a number average molecular weight of 343 as determined by GPC.

| Urethane Polyol C | |
|---|---|
| Ingredients | Percent by Weight |
| bis-hydroxyethyldimerate | 83.5 |
| trimethylhexamethylene diisocyanate | 16.4 |
| dibutyltin dilaurate | 0.01 |

The urethane polyol was prepared as detailed above for urethane polyol A and reduced to 70 percent solids in methyl isobutyl ketone. The urethane polyol had a theoretical hydroxyl value of 41, a Gardner Holdt viscosity of 5 and a number average molecular weight of 343 as determined by GPC.

| Urethane Polyol D | |
|---|---|
| Ingredients | Percent by Weight |
| neopentyl glycol | 22.4 |
| dimer diisocyanate of footnote (2) | 77.6 |
| dibutyltin dilaurate | 0.01 |

The urethane polyol was prepared as detailed above for urethane polyol A and reduced to 70 percent solids in methyl isobutyl ketone. The urethane polyol had a Gardner Holdt viscosity of L, a theoretical hydroxyl value of 68, an acid value of less than 1 and a number average molecular weight of 1515 as determined by GPC.

Preparation of Pigmented Base Coat Compositions

| | Coating Compositions Parts by Weight (grams) | | | |
|---|---|---|---|---|
| Ingredients | A | B | C | D |
| basemix[3] | 188.6 | 188.6 | 188.6 | 188.6 |
| urethane polyol A, above | 18.8 | | | |
| urethane polyol B, above | | 16.6 | | |
| urethane polyol C, above | | | 21.4 | |
| urethane polyol D, above | | | | 21.4 |
| solvent blend[4] | 68 | 49 | 73 | 45 |
| Number 4 Ford Cup viscosity (seconds) | 15.9 | 16.6 | 16.6 | 16.2 |
| Theoretic Total Solids content (percent) | 51.2 | 53.2 | 50.3 | 52.4 |

[3]The basemix for the pigmented basecoating composition was prepared as follows:

| Ingredients | Parts by Weight (grams) |
|---|---|
| TINUVIN 328[a] | 3.0 |
| ethylene glycol monobutyl ether acetate | 10.0 |
| ethoxy ethyl propionate | 10.0 |
| isobutyl isobutyrate | 10.0 |
| microgel[b] | 22.7 |
| polyester polyol[c] | 15.0 |
| polyester polyol[d] | 27.8 |
| RESIMENE 717[e] | 27.4 |
| pigment paste[f] | 48.0 |
| methanol | 6.0 |
| phenyl acid phosphate | 1.1 |
| phosphatized epoxy[g] | 1.5 |
| bentone grind[h] | 6.1 |

[a]This ultraviolet light absorber was commercially available from Ciba-Geigy.
[b]This microgel was prepared as described in Example II of U.S. Pat. 4,147,688.
[c]This polyester polyol was prepared at 100 percent total solids from 59.28 percent EMPOL 1010; (which is dimer acid commercially available from Emery Chemical Company); 17.58 percent cyclohexane dimethanol; 16.68 percent neopentyl glycol; 6.46 percent trimethylolpropane; 0.02 percent butyl stannoic acid; 0.05 percent triphenyl phosphite. The polyol had a hydroxyl value of 302.85, an acid value of 7.85, a Gardner Holdt viscosity of Z4 and a number average molecular weight of 1337 as determined by GPC.
[d]This polyester polyol was prepared at 90 percent total solids in methyl isobutyl ketone from 65 percent 2,2,4-trimethyl-1,3-pentanediol, 35 percent hexahydrophthalic anhydride and 0.20 percent dibutyltin oxide (based on solids). The polyol had a hydroxyl value of 211.3, an acid value of 8.54, a Gardner Holdt viscosity of Z1+ and a number average molecular weight of 339 as determined by GPC.
[e]This melamine formaldehyde crosslinking agent is commercially available from Monsanto.
[f]This pigment paste was prepared by blending the following ingredients:

| Ingredients | Parts by Weight (grams) |
|---|---|
| aluminum flake | 38.5 |
| isobutyl isobutyrate | 31.7 |
| RESIMENE 717 | 29.8 |

[g]This phosphatized epoxy was prepared at 61 percent solids in ethylene glycol monohexyl ether from 63.65 percent Eponex DRH-151 (a hydrogenated diglycidyl ether of bisphenol A commercially available from Shell) and 36.35 percent of phosphoric acid (85 percent). The phosphatized epoxy had an acid value of 117.6 and a Gardner Holdt viscosity of Z3−.
[h]This bentone grind paste was prepared as follows:
A premix was first prepared from 305.29 grams of an acrylic polyol (this polyol was prepared from 10 percent 2-hydroxyethyl acrylate; 2.5 percent methacrylic acid, 25 percent of which was reacted with hydroxyethyl ethyleneimine; 30 percent styrene; 20 percent 2-ethylhexyl acrylate; 19.5 percent butyl acrylate and 18 percent methyl methacrylate. The polyol had an acid value of 6.76 and a Gardner Holdt viscosity of W and was prepared at 52 percent solids in a mixture of 67.5 percent naphthalite, 21.7 percent isobutanol and 10.8 percent toluene) and 386 grams of butyl acetate. To this premix with agitation was added 62.27 grams of bentone and 24.91 grams of polyethylene wax. The mixture was ground with ceramic beads to a Hegman grind of 7.0.
[4]The solvent blend was prepared from 80 percent hexyl acetate and 20 percent isobutyl isobutyrate.

The coating compositions were prepared by combining the ingredients with agitation and reducing with the solvent blend. Each of the pigmented basecoating compositions was applied onto metal panels and a clearcoat was applied overtop. The clearcoat was the following high solids clear coat:

| High Solids Clear Top Coating Composition | |
|---|---|
| Ingredients | Parts by Weight (grams) |
| TINUVIN 328 | 3.0 |
| TINUVIN 292[5] | 1.0 |
| polybutyl acrylate | 0.4 |
| poly(2-ethyl hexyl acrylate)[6] | 0.5 |
| ARMEEN DM 12 D[7] | 4.0 |
| solvent blend[8] | 31.0 |
| ERL 4299[9] | 19.2 |
| epoxy containing acrylic polymer[10] | 31.0 |
| Ester Diol 204-methyl-hexahydrophthalic anhydride half ester[11] | 40.6 |
| acid functional acrylic resin[12] | 2.4 |
| EMERSON 875[13] | 2.4 |
| RESIMENE 717 | 12.5 |
| fumed silica | 12.5 |

[5]This hindered amine light stabilizer is commercially available from Ciba-Geigy.
[6]This is commercially available from Monsanto Corporation as Multiflow.
[7]N,N—dimethyldodecylamine from Akzo Chemical.
[8]This solvent blend was prepared from 25 parts by volume of ortho-hexyl acetate and 75 parts by volume of methyl isobutyl ketone.
[9]Bis(3,4-epoxycyclohexylmethyl)adipate from Union Carbide Corporation.
[10]This epoxy functional acrylic was prepared from 40 percent glycidyl methacrylate, 33 percent methyl methacrylate, 2 percent styrene and 24 percent butyl acrylate using an initiator mixture of 5 percent, 2,2'-azobis (2-methylbutyronitrite) and 2.5 percent tertiary-butyl perbenzoate. This resin was prepared at 60 percent theoretical solids in xylene.
[11]The polyacid half-ester of 1-(3-hydroxy-2,2-dimethylpropyl)-3-hydroxy-2,2-dimethylpropionate((Ester Dol 204) and methylhexahydrophthalic anhydride was prepared from the following mixture of ingredients:

| Ingredients | Parts by Weight (grams) |
| --- | --- |
| Ester Diol 204 | 2550.0 |
| Methylhexahydrophthalic anhydride | 4116.0 |
| Methyl isobutyl ketone | 1666.5 |
| Ethanol | 666.6 |

The Ester Diol 204 and 1466.5 grams of the methyl isobutyl ketone were charged to a reaction vessel and heated under a nitrogen atmosphere to 115° C. The methylhexahydrophthalic anhydride was added over a ninety minute period. The reaction mixture was then cooled to 100° C. followed by the addition of ethanol (to react with residual anhydride) and heating the reaction mixture to reflux and holding for two hours. The reaction mixture was stripped to a pot temperature of 125° C. The reaction mixture was then adjusted to 80 percent solids with methyl isobutyl ketone.
[12]This acid functional acrylic having an acid value of 95.3 and prepared at 74.9 percent solids in methyl isobutyl ketone was prepared from 30 percent 2-ethylhexyl acrylate, 15 percent styrene, 15 percent methacrylic acid, 14.63 percent butyl methacrylate, 0.37 percent methyl methacrylate and 25 percent of an acid functional polyester (polyester prepared from 2 moles methyl hexahydrophthalic anhydride and 1 mole 1,6-hexanediol at 70 percent solids in methyl isobutyl ketone and having an acid value of 182).
[13]Isosteric acid from Emery Chemical Company.

The formulated clear coating composition had a resin solids content of 57.4 percent and a No. 4 Ford cup viscosity of 26.4 seconds. The panels were baked at 121° C. for 30 minutes and then evaluated.

The panels were ranked for smoothness in increasing numerical order from best to worst:
(1) Composition B
(2) Composition A
(3) Composition C Composition B had the best flop, i.e., the visual change in brightness or lightness of the metallic aluminum flake with a change in viewing angle.

Composition B was good for brightness and clearcoat smoothness.

EXAMPLE II

This example illustrates the use of a hydrophobic urethane polyol according to the present invention as an additive in a pigmented basecoating composition for color plus clear application. Two different basecoat compositions were prepared with the same amount of urethane polyol however one composition utilized less bentone which is utilized to improve the strike-in resistance. As the data shows, the urethane polyol facilitated the reduction of bentone without detrimentally affecting strike-in resistance.

| | Compositions | |
| --- | --- | --- |
| | A | B |
| Ingredients | Parts by Weight (grams) | |
| TINUVIN 328 | 3.0 | 3.0 |
| isobutyl isobutyrate | 8.0 | 8.0 |
| ethoxy ethyl propionate | 8.0 | 8.0 |
| ethylene glycol mono- | 10.0 | 10.0 |
| butyl ether acetate | | |
| microgel of footnote (b) | 22.7 | 22.7 |
| urethane polyol[14] | 11.4 | 11.4 |
| polyester polyol[15] | 57.8 | 57.8 |
| RESIMENE 717 | 26.2 | 26.2 |
| pigment paste[16] | 32.0 | 32.0 |
| isobutyl alcohol | 6.0 | 6.0 |
| phenyl acid phosphate | 1.1 | 1.1 |
| phosphated epoxy of footnote (g) | 1.5 | 1.5 |
| bentone grind of footnote (h) | 18.75 | 6.1 |

[14]This hydrophobic urethane polyol additive was prepared as follows:

| Charge | Ingredients | Parts by Weight (grams) |
| --- | --- | --- |
| I | methyl isobutyl ketone | 64.8 |
| | dibutyltin dilaurate | 0.18 |
| | neopentyl glycol | 258.3 |
| II | dimer diisocyanate of footnote (2) | 1340.9 |
| | methyl isobutyl ketone | 335.0 |
| III | methyl isobutyl ketone | 285.7 |

A reactor vessel equipped with thermometer, addition funnel and nitrogen inlet tube was charged with (I) and heated to 60° C. Charge (II) was added dropwise over a period of about 70 minutes while heating to 100° C. Charge (III) was then added and the temperature was maintained at 100° C. until analysis of a sample of the reaction mixture by infrared spectroscopy indicated the disappearance of isocyanate. The reaction mixture was then cooled. The resultant product had a total solids content of 70.8 percent determined for one hour at 110° C., a stokes viscosity of 60.8, a Gardner Holdt viscosity of Z4, and a number average molecular weight of 5412 determined by GPC.
[15]This polyol was prepared at 90 percent total solids in methyl amyl ketone from 24.28 percent trimethylolpropane, 27.90 percent hexahydrophthalic anyydride and 47.82 percent of CARDURA E (an aliphatic epoxy resin commercially available from Shell Chemical Company).
[16]The paste was prepared as follows:

| Ingredients | Parts by Weight (grams) |
| --- | --- |
| blue grind paste - 1[i] | 11.9 |
| blue grind paste - 2[j] | 25.0 |
| aluminum flake | 144.6 |
| xylene | 117.4 |

[i]This blue grind paste was prepared by combining the following ingredients and grinding to a Hegman grind greater than 7:

| Ingredients | Parts by Weight (grams) |
| --- | --- |
| monarch blue pigment* | 8.5 |
| acrylic polyol detailed in footnote (h) | 48.1 |
| polyethylene wax in xylene | 0.25 |
| n-butyl acetate | 43.15 |

*commercially available from Ciba-Geigy.
[j]This blue grind paste was prepared by combining the following ingredients and grinding to a Hegman grind of greater than 7.

| Ingredients | Parts by Weight (grams) |
| --- | --- |
| MONDLITE blue pigment** | 12.0 |
| acrylic polyol detailed in footnote (h) | 48.1 |
| polyethylene wax in xylene | 0.25 |
| n-butyl acetate | 39.65 |

**Commercially available from C-I-L, Inc.

The ingredients were combined under high speed agitation.

The basecoating compositions were prepared by combining the ingredients with agitation. Composition A had a theoretical total solids content of 49.1 percent and a Number 4 Ford cup viscosity of 17.6 seconds after reduction with 98 grams of the solvent blend of footnote (4). Composition B had a theoretical total solids content of 50.7 percent and a Number 4 Ford cup viscosity of 17.8 seconds after reduction with 93 grams of the solvent blend of footnote (4).

The basecoat compositions were applied onto metal panels and topcoated with the high solids clear coating composition of Example I, above. The panels were baked at 121° C. for 30 minutes and then visually evaluated.

The panel coated with Composition A and the clearcoat had excellent brightness. The panel coated similarly with Composition B had excellent smoothness however it darkened.

EXAMPLE III

Part A

This part of the example illustrates the preparation of a urethane polyol suitable for use as a film former in accordance with the present invention.

| Ingredients | Parts by Weight (grams) |
| --- | --- |
| polyester polyol[17] | 10,441 |
| dimer diisocyanate of footnote (2) | 4,026 |
| dibutyltin dilaurate | 1.3 |
| xylene | 1,322 |

[17]This polyester polyol was prepared as a 90 percent solids solution in xylene from 2.0 moles neopentyl glycol, 1.0 mole hexahydrophthalic anhydride, 0.10 percent triphenyl phosphite and 0.01 percent butyl stannoic acid. The polyester polyol had a hydroxyl value of 271.23, acid value of 7.93, Gardner Holdt viscosity of Z4 and number average molecular weight of 272 as determined by GPC using polystyrene as a standard.

A suitably equipped reactor vessel was charged with the aforelisted ingredients and heated to 60° C. under a nitrogen blanket. After about one hour the temperature was raised to 90° C. and maintained at this temperature for about 20 minutes at which time analysis of a sample of the mixture by infrared spectroscopy indicated the disappearance of isocyanate. The resultant urethane polyol had a combined hydroxyl value and acid value of 142.2, a total solids content determined for one hour at 110° C. of 81.9 percent, a stokes viscosity of 58.0 and a number average molecular weight of 583 as determined by GPC using polystyrene as a standard.

Part B

This part of the example illustrates the preparation of a high solids, clear coating composition using the urethane polyol of Part A, above and its evaluation as a clear topcoat over a pigmented basecoat in a "color plus clear" application.

| Ingredients | Parts by Weight (grams) |
| --- | --- |
| basemix[18] | 144.25 |
| urethane polyol of Part A, above | 11.8 |

[18]The basemix for the clear coating composition was prepared as follows:

| Ingredients | Parts by weight (grams) |
| --- | --- |
| TINUVIN 328 | 3 |
| xylene | 15 |
| AROMATIC 100[k] | 15 |
| microgel of footnote (b) | 6.8 |
| CYMEL 1130[l] | 35 |
| urethane polyol of Part A, above | 61.1 |
| polybutylacrylate[m] | 0.7 |
| ethanol | 6.0 |
| TINUVIN 292 | 0.35 |
| dodecylbenzene sufonic acid catalyst | 1.3 |

[k]This aromatic petroleum distillate was commercially available from Exxon.
[l]This was a mixed methylated butylated melamine formaldehyde crosslinking agent commercially available from American Cyanamid.
[m]This was a flow control agent.
The basemix was prepared by combining the ingredients with agitation.

The clear coating composition was prepared by combining the ingredients with agitation. The composition had a total solids content of 57.2 percent determined at 110° C. for one hour, and number 4 Ford cup viscosity of 21.1 seconds after reduction with 21 grams of xylene.

The clear coating composition was applied over cold rolled steel panels coated with ED 3150W, commercially available from Advanced Coatings Technologies, Inc. The panels had been basecoated with an aluminum flake containing pigmented basecoat composition commercially available from PPG Industries, Inc. as HUBC 15898. The coated panels were cured at 121° C. for 30 minutes and evaluated for gloss, distinctness of image (DOI), Sward hardness and Tukon Hardness. The data is set out in Table I below. The gloss was determined using a Gardner glossmeter; the DOI was determined using an I²R Glow Box ™ distinctness of image meter (model GB11-8GM, 115 V/60 Hz) available from Instruments for Research and Industry in Cheltenham, PA; the Tukon Hardness was determined according to ASTM E384 and the Sward Rocker Hardness was determined according to ASTM D 2134.

EXAMPLE IV

This example illustrates the preparation and evaluation of a clear coating composition using the urethane polyol of Example III, above as a film former.

| Ingredients | Parts by Weight (grams) |
| --- | --- |
| basemix of footnote (18) | 144.25 |
| urethane polyol of Example III | 5.9 |
| polyether-urethane[19] plasticizer | 6.25 |

[19]This urethane plasticizer was prepared as follows:

| Charge | Ingredients | Parts by Weight (grams) |
| --- | --- | --- |
| A | TERACOL 650[n] | 1,365 |
|   | dimer diisocyanate of footnote (2) | 910 |
|   | dibutyltin dilaurate | 0.22 |
|   | butyl acetate | 250 |
| B | butyl acetate | 310 |

[n]This polytetramethylene glycol ether had a molecular weight of 650 and was commercially available from E. I. DuPont deNemours.
Charge (A) was placed in a suitably equipped reactor vessel under nitrogen blanket and heated to 60° C. After 30 minutes the temperature was raised to 90° C. and held for 80 minutes until analysis of a sample of the mixture by infrared spectroscopy indicated the disappearance of isocyanate. After Charge (B) was added the Gardner Holdt viscosity was Z4. The polyether urethane had a total solids content of 80.3 percent at 110° C. for one hour, a hydroxyl value of 21.17 plus the acid value and a number average molecular weight of 7757 determined by GPC.

The coating compposition was prepared and evaluated as set out in Part B of Example I. The results appear in Table I. The coating composition had a total solids content of 55.8 determined at 110° C. for 1 hour and a number 4 Ford cup viscosity of 21.4 seconds after reduction with 30 grams of xylene.

EXAMPLE V

This example illustrates the preparation and evaluation of a clear coating composition utilizing a different urethane polyol as film former.

| Ingredients | Parts by Weight (grams) |
|---|---|
| basemix[20] | 144.35 |
| urethane polyol[21] | 11.8 |

[20] This basemix was identical to that of footnote (18) above with the exception that it contained 61.2 parts by weight of the urethane polyol described in footnote (21) below in place of the urethane polyol of Example III.
[21] This urethane polyol was prepared as described below:

| Charge | Ingredients | Parts by Weight (grams) |
|---|---|---|
| A | polyester polyol[o] | 1,700 |
|  | dimer diisocyanate of footnote (2) | 510 |
|  | dibutyltin dilaurate | 0.20 |
|  | xylene | 57 |
| B | xylene | 132 |

[o] This polyester polyol was prepared as follows:

| Charge | Ingredients | Parts by Weight (grams) |
|---|---|---|
| A | 2,2,4-trimethylpentanediol | 1,263.6 |
|  | hexahydrophthalic anhydride | 1,332.8 |
|  | neopentyl glycol | 900.1 |
|  | butyl stannoic acid | 1.75 |
|  | triphenyl phosphite | 365.3 |

A suitable equipped reactor vessel was charged with (A) and heated to 200° C. under nitrogen blanket. The mixture was maintained at 200° C. for about 17 hours until an acid value of 9.7 was attained. The polyester polyol had a Gardner Holdt viscosity after the addition of Charge (B) of Z3+, a total solids content of 76 percent at 110° C. for one hour, an hydroxyl value of 248.5 plus the acid value, an acid value of 8.4 and a number average molecular weight of 876 as determined by GPC. The urethane polyol was prepared by charging (A) to a reactor vessel under a nitrogen blanket and heating to 60° C. After about 20 minutes the temprrature was raised to 90° C. and maintained here until infrared spectroscopy indicated the disappearance of isocyanate (about 20 minutes). The resultant urethane polyol had a Gardner Holdt viscosity of Z2+ after the addition of Charge (B); a hydroxyl value of 138.33 plus the acid value, an acid value of 6.0 and a total solids content of 79.0 at 110° C. for one hour.

The coating composition was prepared and evaluated as detailed in Example III part B, above. The coating composition had a total solids content of 59.4 percent at 110° C. for one hour and a number 4 Ford cup viscosity of 21.4 seconds. The results appear in Table I.

EXAMPLE VI

This example illustrates the preparation and evaluation of a clear coating composition using the urethane polyol of Example V, above as a film former.

| Ingredients | Parts by Weight (grams) |
|---|---|
| basemix of footnote (20) | 144.35 |
| urethane polyol of footnote (21) | 5.9 |
| polyether-urethane plasticizer of footnote (19) | 6.25 |

The coating composition was prepared by combining the ingredients together with agitation and evaluated as detailed in Example III, Part B, above. The coating composition had a total solids content of 57.6 percent determined at 110° C. for one hour and a number 4 Ford cup viscosity of 21.2 seconds after reduction with 15 grams of xylene. The results appear in Table I.

TABLE I

| Example | Dry Film Thickness Basecoat/Clearcoat (mils) | Gloss | DOI | Sward Hardness | Tukon Hardness |
|---|---|---|---|---|---|
| III | 0.61/1.89 | 88 | 90 | 36 | 5.30 |
| IV | 0.61/1.77 | 87 | 90 | 34 | 4.85 |
| V | 0.65/1.86 | 88 | 90 | 42 | 6.95 |
| VI | 0.72/1.75 | 87 | 90 | 42 | 4.85 |

What is claimed is:

1. A high solids coating composition having a total solids content of at least 40 percent, comprising as a film former a urethane polyol having a hydroxyl value of at least about 50 and a number average molecular weight of no more than 4,000 which is prepared from reactants comprising a hydroxyl functional polyether or polyester or mixtures thereof of a number average molecular weight less than 1000 and average functionality not exceeding 3 and at least 10 weight percent of a polyisocyanate having isocyanate groups separated by one or more hydrophobic moieties, each moiety containing at least 12 consecutive carbon atoms in a continuous chain, the percentage based on the total weight of the hydroxyl functional polyether or polyester or mixtures thereof and polyisocyanate; and an aminoplast crosslinking agent.

2. The coating composition of claim 1 wherein the urethane vehicle has a number average molecular weight ranging from about 500 to about 3,000.

3. The coating composition of claim 2 wherein the number average molecular weight ranges from 500 to about 1,500.

4. The coating composition of claim 1 wherein the urethane is prepared from a mixture of polyether diol and polyester diol.

5. The coating composition of claim 1 wherein the urethane is prepared from a polyester diol.

6. The coating composition of claim 1 wherein each hydrophobic moiety contains at least 16 consecutive carbon atoms in a continuous chain.

7. The coating composition of claim 6 wherein the polyisocyanate is dimer diisocyanate.

8. The coating composition of claim 1 wherein the hydroxyl value of the film former is at least 75.

9. The coating composition of claim 8 wherein the hydroxyl value is at least 100.

10. The coating composition of claim 1 additionally comprising metallic pigment.

11. A high solids coating composition having a total solids content of at least 40 percent, comprising a polyester polyol as the film forming polymer, said polyester containing one or more hydrophobic moieties, each moiety containing at least 12 consecutive carbon atoms in a continuous chain and the total amount of the hydrophobic moieties constituting at least 40 percent by weight of the polyester film forming polymer; a substantially hydrophobic, urethane additive having a hydroxyl value of at least about 100 which is prepared from reactants comprising a polyol having a number average molecular weight of less than 1,000 and a polyisocyanate having isocyanate groups separated by one or more hydrophobic moieties, each moiety containing at least 12 consecutive carbon atoms in a continuous chain; and a crosslinking agent adapted to crosslink with the film forming polymer.

12. The coating composition of claim 11 wherein each moiety contains at least 16 consecutive carbon atoms in a continuous chain.

13. The coating composition of claim 12 wherein the polyisocyanate is dimer diisocyanate.

14. The coating composition of claim 11 wherein the hydrophobic urethane additive has a number average molecular weight which does not exceed 4,000.

15. The coating composition of claim 14 wherein the urethane additive has a number average molecular weight of from about 500 to about 4,000.

16. The coating composition of claim 15 wherein the number average molecular weight ranges from about 500 to about 1,500.

17. The coating composition of claim 11 wherein the crosslinking agent is an aminoplast resin.

18. The coating composition of claim 11 additionally comprising metallic pigment.

19. The coating composition of claim 11 wherein the hydrophobic urethane additive is prepared from neopentyl glycol and a mixture of polyisocyanates comprising a diisocyanate having isocyanate groups separated by at least 16 consecutive carbon atoms in a continuous chain and a diisocyanate having isocyanate groups separated by no more than 9 consecutive carbon atoms in a continuous chain.

20. A method of forming a multicoated article comprising:
  (a) applying to the surface of a substrate a high solids base coating composition having a total solids content of at least 40 percent, comprising as a film former a urethane vehicle having a hydroxyl value of at least about 50 and a number average molecular weight of no more than 4,000 which is prepared from reactants comprising a hydroxyl functional polyether or polyester or mixtures thereof of a number average molecular weight less than 1,000 and average functionality not exceeding 3 and at least 10 weight percent based on the total weight of hydroxyl functional polyether or polyester or mixtures thereof and polyisocyanate of a polyisocyanate having isocyanate groups separated by one or more hydrophobic moieties, each moiety containing at least 12 consecutive carbon atoms in a continuous chain; and an aminoplast crosslinking agent,
  (b) applying to said basecoat a clear film forming composition; and
  (c) at least partially curing the multicoated article to form a composite coating on the substrate.

21. A method of forming a multicoated article comprising:
  (a) applying to the surface of a substrate a pigmented basecoating composition;
  (b) applying to said basecoat a clear high solids coating composition having a total solids content of at least 40 percent, comprising as a film former a urethane vehicle having a hydroxyl value of at least about 50 and a number average molecular weight of no more than 4,000 which is prepared from reactants comprising a hydroxyl functional polyether or polyester or mixtures thereof of a number average molecular weight less than 1,000 and average functionality not exceeding 3 and at least 10 weight percent based on the total weight of hydroxyl functional polyether or polyester and polyisocyanate of a polyisocyanate having isocyanate groups separated by one or more hydrophobic moieties, each moiety containing at least 12 consecutive carbon atoms in a continuous chain; and an aminoplast crosslinking agent,
  (c) at least partially curing the multicoated article to form a composite coating on the substrate.

22. The method of claim 20 wherein the film forming polymer of the clear film forming coating composition contains hydrophobic moieties which constitute less than 20 percent by weight of the polymer.

23. The method of claim 21 wherein the film-forming polymer of the basecoating composition contains hydrophobic moieties which constitute less than 20 percent by weight of the polymer.

24. A method of forming a multicoated article comprising:
  (a) applying to the surface of a substrate a high solids base coating composition having a total solids content of at least 40 percent comprising a polyester polyol as the film forming polymer, containing one or more hydrophobic moieties, each moiety containing at least 12 consecutive carbon atoms in a continuous chain and the total amount of the hydrophobic moieties constituting at least 40 percent by weight of the polyester film forming polymer; a substantially hydrophobic, urethane additive having a hydroxyl value of at least about 100 which is prepared from reactants comprising a polyol having a number average molecular weight of less than 1,000 and a polyisocyanate having isocyanate groups separated by one or more hydrophobic moieties, each moiety containing at least 12 consecutive carbon atoms in a continuous chain; and a crosslinking agent adapted to crosslink with the film forming polymer;
  (b) applying to said basecoat a clear film forming composition; and
  (c) at least partially curing the multicoated article to form a composite coating on the substrate.

25. A method of forming a multicoated article comprising:
  (a) applying to the surface of a substrate a pigmented basecoating composition;
  (b) applying to said basecoat a high solids clear coating composition having a total solids content of at least 40 percent comprising a polyester polyol as the film forming polymer, containing one or more hydrophobic moieties, each moiety containing at least 12 consecutive carbon atoms in a continuous chain and the total amount of the hydrophobic moieties constituting at least 40 percent by weight of the polyester film forming polymer; a substantially hydrophobic, urethane additive having a hydroxyl value of at least about 100 which is prepared from reactants comprising a polyol having a number average molecular weight of less than 1,000 and a polyisocyanate having isocyanate groups separated by one or more hydrophobic moieties, each moiety containing at least 12 consecutive carbon atoms in a continuous chain; and a crosslinking agent adapted to crosslink with the film forming polymer;
  (c) at least partially curing the multicoated article to form a composite coating on a substrate.

* * * * *